United States Patent [19]
Bayer

[11] Patent Number: 5,647,951
[45] Date of Patent: Jul. 15, 1997

[54] MULTI-PURPOSE WEED SUPPRESSANT AND PLANT GROWTH ENHANCEMENT DEVICE

[76] Inventor: John Bayer, 19090 4th Ave., Stevinson, Calif. 95374

[21] Appl. No.: 646,427

[22] Filed: May 7, 1996

Related U.S. Application Data

[62] Division of Ser. No. 538,693, Oct. 3, 1995.

[51] Int. Cl.⁶ .................................................. A01G 13/02
[52] U.S. Cl. ........................ 156/62.2; 162/4; 162/127; 162/129; 47/9; 47/25; 264/87
[58] Field of Search .......................... 162/4, 125, 299, 162/13, 127, 129; 264/113, 87, DIG. 69; 47/9, 95, 25; 156/62.2

[56] References Cited

U.S. PATENT DOCUMENTS

| | | |
|---|---|---|
| 2,098,733 | 11/1937 | Sale . |
| 2,414,833 | 1/1947 | Osborne .................................. 162/129 |
| 2,928,765 | 2/1960 | Kurjan ..................................... 162/299 |

FOREIGN PATENT DOCUMENTS

| | | |
|---|---|---|
| 8501418 | 4/1985 | WIPO . |

*Primary Examiner*—Michael W. Ball
*Assistant Examiner*—Sam Chuan Yao
*Attorney, Agent, or Firm*—Townsend and Townsend and Crew LLP

[57] ABSTRACT

An agricultural growth control device (2) includes an organic, biodegradable, layer (6) and an impermeable sheet (4) affixed to the underside of the organic layer to form a unitary ground collar (8). The ground collar defines at least one hole (10) to allow growth of a plant (P) therethrough while suppressing the growth of weeds or grass around the plant. The impermeable sheet is preferably formed from a slurry of cellulosic fiber and water and the organic layer is preferably formed from a slurry of fiber, water and finely chopped organic material, such as straw, manure, leaves or almond wood chips. The fiber and chopped organic material provide a semi-rigid mulch cover for suppressing weeds around the plant. The mulch cover is easily positioned around the plant and, once it is so disposed, will be relatively impervious to severe weather, such as heavy rainfall and winds. The chopped organic material, particularly almond wood chips, enhance the appearance of the mulch cover.

13 Claims, 5 Drawing Sheets

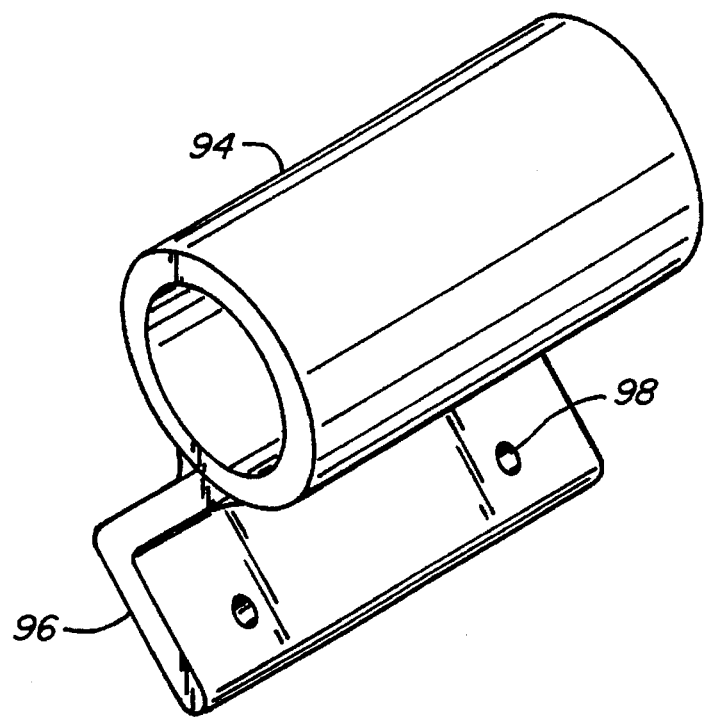
FIG. 8.
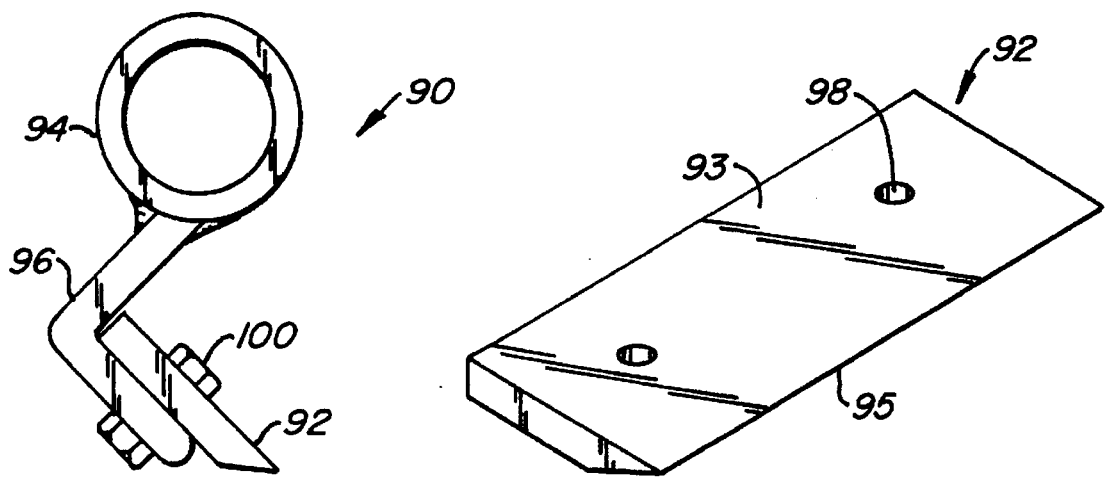
FIG. 9.
FIG. 10.

MULTI-PURPOSE WEED SUPPRESSANT AND PLANT GROWTH ENHANCEMENT DEVICE

This is a division of application Ser. No. 08538,693 filed Oct. 3, 1995.

BACKGROUND OF THE INVENTION

This invention relates to plants generally, and more specifically to a multi-purpose device for suppressing weeds and enhancing plant growth.

Crops, plants, trees and vegetables growing on commercial farms or in municipal and household gardens must constantly battle weeds for survival. Undesired growth of weeds, grass and the like in the region immediately adjacent the stems or trunks of plants and trees is both unsightly and difficult to control because ordinary mowers and other cutting devices cannot efficiently cut such undesired growth.

Although there are existing chemicals that can be used to preferentially kill the weeds, these chemicals are typically harmful to the environment. Other methods of suppressing weeds, such as positioning plastic or cloth weed guards as barriers around plants and crops, are expensive and they also can be harmful to the environment because plastic and cloth are generally not biodegradable. Less harmful or biodegradable weed barriers, such as newspaper or cardboard, are typically swept away by the wind or a heavy rainfall.

Another problem faced by farmers is disposing of the waste byproducts that result from growing food products on farms. For example, almond growers must destroy massive quantities of wood pruned from their trees every year. Burning the wood is harmful to the environment and cogeneration plants have become too expensive. What is needed is a relatively inexpensive method of discarding farm waste products, such as almond wood chips, without harming the environment.

SUMMARY OF THE INVENTION

The present invention is directed to an agricultural growth control device for suppressing weeds and enhancing plant growth. The growth control device will effectively inhibit the growth of ground cover, such as weeds and grass, around the base of plants, trees or other vegetation. In addition, the device will enhance the growth of the plant by collecting rainwater and gradually introducing nutrients or fertilizers into the soil around the plant. The device of the present invention also provides a relatively inexpensive method of discarding farm waste products, such as almond wood chips, without harming the environment.

The agricultural growth control device includes an impermeable sheet containing at least one hole and an organic, biodegradable layer affixed to the top side of the impermeable sheet. The growth control device has at least one hole cut through the impermeable sheet to allow growth of a plant therethrough while suppressing the growth of weeds or grass around the hole. The impermeable sheet preferably formed from a slurry of cellulosic fiber, such as newspaper or cardboard, and water. The organic/acetic top layer is preferably formed from a slurry of paper, water and finely chopped organic material, such as straw, manure, leaves or almond wood chips.

One of the advantages of the present invention is that the fiber and chopped organic material provide a semi-rigid mulch cover for suppressing weeds around the plant. The mulch cover is easily positioned around the plant and, once it is so disposed, will be relatively impervious to severe weather, such as heavy rainfall and winds. The chopped organic material, particularly almond wood chips, enhance the appearance of the mulch cover. In addition, the entire device will eventually (within a few months) decompose into the soil, thereby providing an easy, non-harmful method of disposing of these wood chips.

The present invention also provides a unique method for manufacturing the agricultural growth control device. The impermeable sheet is formed by grinding a secondary cellulosic fiber, such as paper, into water to form a slurry. The paper slurry is then drained, rolled and pressed on a belt to remove as much of the moisture as possible, forming a semi-rigid first layer. The organic layer is formed by mixing the chopped up almond wood chips (or other organic material) with paper into a second slurry. This second slurry is applied to the first layer and the combination is pressed to eliminate moisture and then baked to create the final semi-rigid product. The paper helps the wood chips stick together and helps the second layer stick to the first layer.

The semi-rigid product can be individually tailored for large farms or for individual trees, plants or vegetables. For example, a square or rectangular piece with a relief or hole in the center may be placed onto the ground over a seed so that a plant can grow through the mulch cover, but weeds cannot. In addition, a curvature can be formed in the mulch cover to cause rainwater to flow towards the plant, rather than into the soil, thereby conserving the water. The impermeable sheet may also include soil nutrients, chemical fertilizers or other water soluble soil-conditioning agents imbedded therein. These agents will gradually seep into the adjacent soil to enhance the growth of the plant.

In a specific configuration, the almond wood chips and fiber are chopped into fine pieces by a chip cutter before they are mixed with the water to form a slurry. The chip cutter comprises an axle shaft connected to a cylindrical base assembly made of a plurality of pipes extending through circumferentially spaced holes in annular spacer disks. A plurality of cutting blades are slidably and rotatably mounted to the pipes. The cutting blades are mounted between the spacer disks along each pipe and extend in both the circumferential and longitudinal directions. The axle shaft is coupled to a motor for rotating the base assembly and the cutting blades around the longitudinal axis. The organic material and/or newspaper can then be fed into the rotating blades and cut into finely chopped pieces.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIGS. 8–10 illustrate one of the cutting assemblies of the chip cutter of FIG. 5.

DESCRIPTION OF THE PREFERRED EMBODIMENTS

Figure 1:
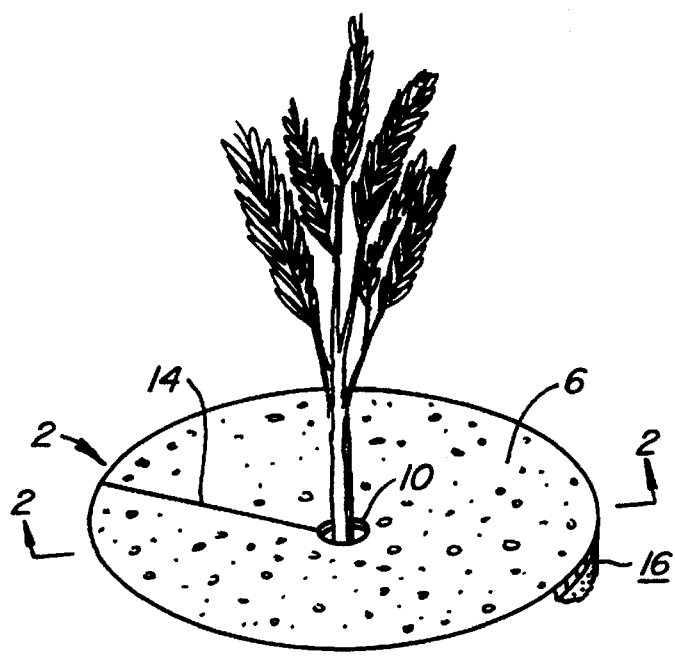
FIG. 1 is a perspective view of an agricultural growth control device manufactured according to the principles of the present invention, illustrating one potential use for the device.

Referring to the drawings in detail, wherein like numerals indicate like elements, an agricultural growth control device 2 is shown constructed according to the principles of the present invention. Agricultural growth control device 2 generally includes an impermeable sheet 4 bonded to the underside of a biodegradable, organic top layer 6 to thereby form a unitary ground collar 8 for disposition around the base of a tree, bush, plant or other vegetation.

Figure 2:
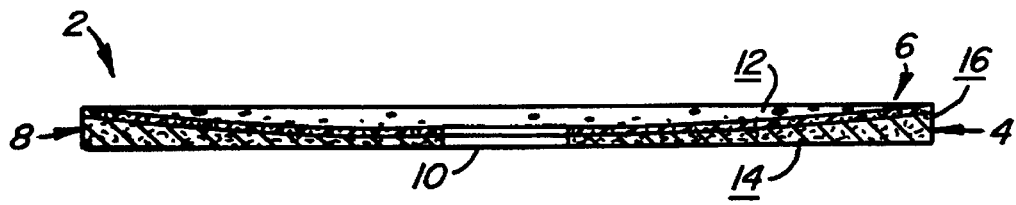
FIG. 2 is a cross-sectional view of the agricultural growth control device taken along lines 2—2 in FIG. 1.

Referring to FIG. 2, impermeable sheet 4 and organic layer 6 each include an opening aligned with each other to form a central hole 10 through collar 8. Hole 10 allows a plant to grow through device 2 and preferably has a diameter of ½ to 3 inches. Of course, hole 10 may be larger if, for example, ground collar 8 is disposed around large trees or bushes. Organic layer 6 preferably has a concave upper surface 12 that slopes downward towards hole 10. Likewise, the impermeable sheet 4 has a generally concave shape and a relatively planar lower surface 14 so that the thickness of the central portion of collar 8 is substantially less than the thickness of the perimetrical edge of collar 8. Concave surface 12 of biodegradable sheet 6 and the concave shape of mat 4 allow rainwater to flow radially inward toward central hole 10 and plant P. This facilitates plant growth in dry regions because the plant is able to receive water that otherwise may have been absorbed into the ground surrounding plant P.

As apparent from FIG. 1, collar 8 is formed with a slit 14 extending from an outer surface 16 of collar 8 to central hole 10 so that collar 8 can be easily wrapped around the stem of a plant P. Collar 8 precludes undesired vegetation, such as weeds or grass, from growing in the region immediately adjacent plant P. To that end, collar 8 will preferably have a diameter sufficient to block or at least impede the growth of surrounding weeds or grass that will substantially interfere with the growth of plant. This diameter will, of course, vary depending on many variables, such as the surrounding vegetation, the type of plant or the horizontal extent of the plant's roots under the ground.

Impermeable sheet 4 can be of any thickness, but is preferably in the range of ⅛ to 2 inches. The sheet 4 will comprise at least 50% by volume cellulosic fibers and preferably at least 75% by volume cellulosic fibers. Typical suitable cellulosic fibers include secondary fibers, such as paper, disposable diapers, cardboard, newspaper etc. Primary fibers, such as trees, sisal, jute and the like, may also be utilized for impermeable sheet 4. As discussed in more detail below, sheet 4 is preferably formed by mixing the fibers with water in a slurry and pressing and heating the slurry to form a semi-rigid mat. Other materials, such as seeds, chemical fertilizer, soil nutrients, such as nitrogen, phosphorus and potassium, or other water soluble soil-conditioning agents, can be imbedded into sheet 4. These materials may be imbedded into the impermeable sheet after it has been dried and pressed or they may be added to the fiber slurry during the manufacture of agricultural growth control device 2.

Biodegradable, organic layer 6 may be formed from a variety of materials that will enhance the appearance of device 2 and will eventually (within a few weeks to a few months) decompose into the soil. In the preferred embodiment, organic layer will comprise waste byproducts, such as straw, manure, leaves or almond wood chips, that result from growing food products on farms. These waste byproducts are typically difficult and often expensive to discard.

In a specific embodiment, organic layer will comprise at least 40%, preferably at least 60%, by volume of finely chopped almond wood chips. In addition, organic layer will comprise at least 20% of a paper product, such as newspaper or cardboard. The wood chips and the paper (which act as a binder) are mixed together with water in a slurry and then dried to form a rigid product, as discussed in detail below. The almond wood chips provide an aesthetic appearance to collar 8 and the paper helps the wood chips stick together. The entire layer will eventually decompose into the ground, thereby providing a non-harmful method of disposing of the almond wood chips.

Figure 4A:
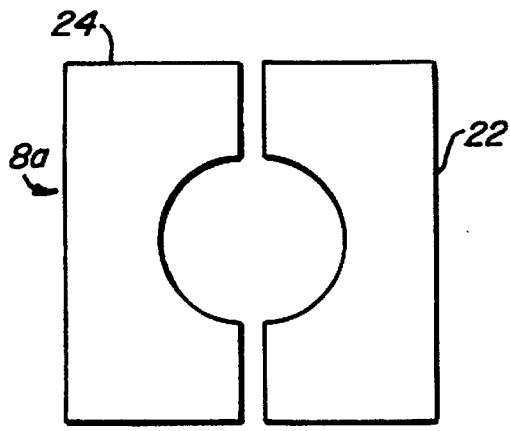
FIGS. 4A–4C are schematic views of alternative embodiments of the agricultural growth control device of FIG. 1.
Figure 4B:
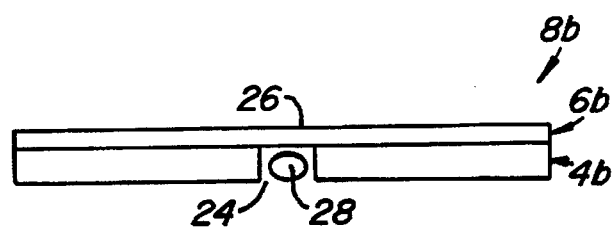
Figure 4C:
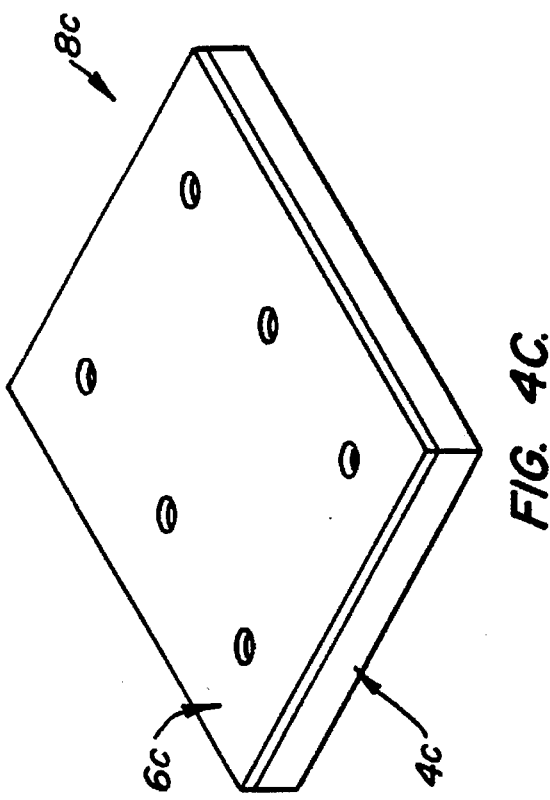

It should be noted that the agriculture growth control device of the present invention is not limited to the above configuration. In fact, the device of the present invention can be individually tailored for a variety of different applications. For example, collar 8a may comprise a number of separable portions 20, 22 (see FIG. 4A) to facilitate the placement of collar 8a around larger vegetation, such as a tree or large bush. In this configuration; collar 8a may have a variety of shapes other than circular, as is illustrated by the rectangular shape in FIG. 4A. In addition, sheet 4b may include a relief 24 underlying a solid portion 26 of organic layer 6b, as shown in FIG. 4B. A seed 28 is placed within the relief 24 so that a plant can grow through layer 6b. Alternatively, collar 8c may comprise a number of holes 10c for a plurality of plants, such as a vegetable or flower garden (shown bottom side up in FIG. 4c).

Figure 3:
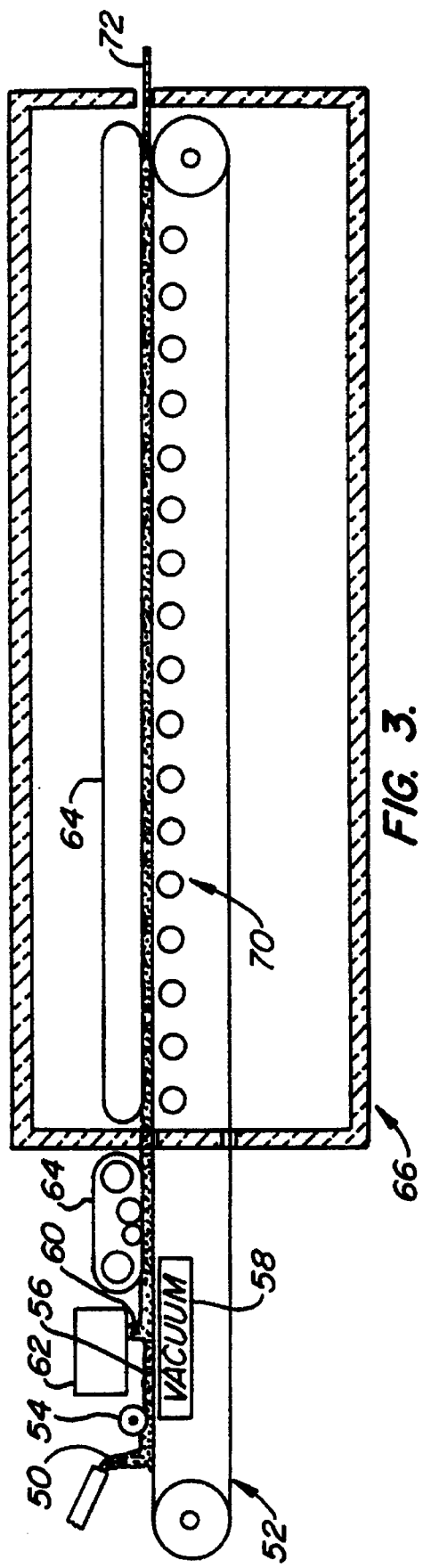
FIG. 3 is a schematic view of a method of manufacturing an agricultural growth control device according to the invention.

The method for constructing collar 8 will now be described with reference to FIG. 3. The impermeable sheet 4 (shown in FIG. 2) is formed by grinding a paper material, such as newspaper, into water to form a fiber slurry 50. Preferably, fiber slurry 50 will initially comprise less than 20% by volume of paper material and more preferably about 5% by volume of paper material (i.e., 95% by volume of water). The fiber slurry 50 is then poured onto an endless belt 52 having a number of small openings (not shown) to allow some of the water to immediately drain from fiber slurry 50. The slurry is pressed by a roller 54 to remove another portion, preferably about 60 to 80%, of the water from slurry 50 to form a partially solidified layer 56. In addition, suction pressure may be applied to the underside of belt 52 with, for example, a vacuum 58, to facilitate the removal of the water.

A second slurry 60 is then introduced onto the top of solidified layer 56 through a mixer 62. Second slurry 60 preferably comprises a mixture of about 5–95% by volume of a biodegradable, organic material, such as almond wood chips, and 5–95% by volume of water. Since layer 56 is substantially more solidified than second slurry 60, the second slurry will generally rest on top of layer 56. The newspaper helps the slurry 60 stick to the top of layer 56. At this point, first and second slurries 50, 60 are delivered through a vacuum press 64. Vacuum press 64 removes water by suction and by pressing the slurries between press 64 and belt 52.

Other materials, such as seeds, chemical fertilizer or soil nutrients may be added during the manufacturing process. In the preferred embodiment, the additional materials will form a part of the initial fiber slurry 50 that is introduced onto belt 52. However, these materials may be added with the second slurry 60 or, they may be added before slurry 60 has been introduced (as fiber slurry 50 is slowly becoming solidified). Of course, the materials may also be imbedded into the fiber mat 4 after collar 8 has been completely solidified (discussed below).

After a substantial portion of the water has been removed from slurries 50, 60 (preferably about 80 to 90%), belt 52 moves the mixture into an enclosed housing 66. Within this housing 66, the slurries are pressed between a draper chain 68 and belt 52. In addition, slurries 50, 60 are heated by a heater 70 to further solidify and dry the mixture. The final semi-rigid product 72 then exits housing 66 and is cut into various shapes and sizes depending on the application, as discussed above. For example, hole 10 may be drilled through collar 8 and concave upper surface 12 may be formed by conventional techniques, e.g., contouring the ground surface. Alternatively, the semi-rigid product 72 may be formed into a large roll as it is discharged from belt 52, instead of cutting the binder into discrete sizes and shapes. The roll can be used, for example, on large farms for planting a crop through the roll.

Figure 5:
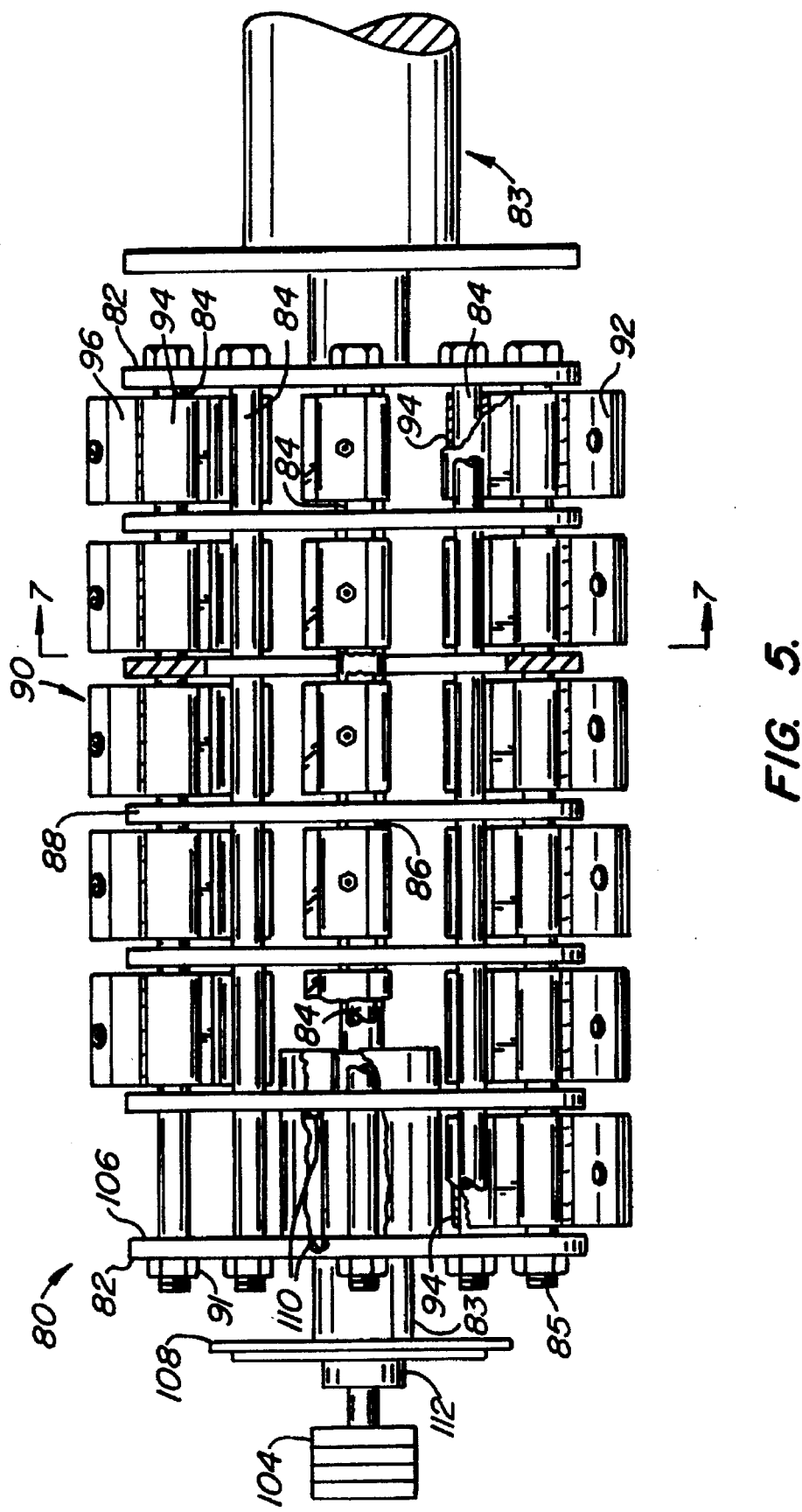
FIG. 5 is a partial side cut-a-way view of a chip cutter according to the principles of the present invention.
Figure 6:
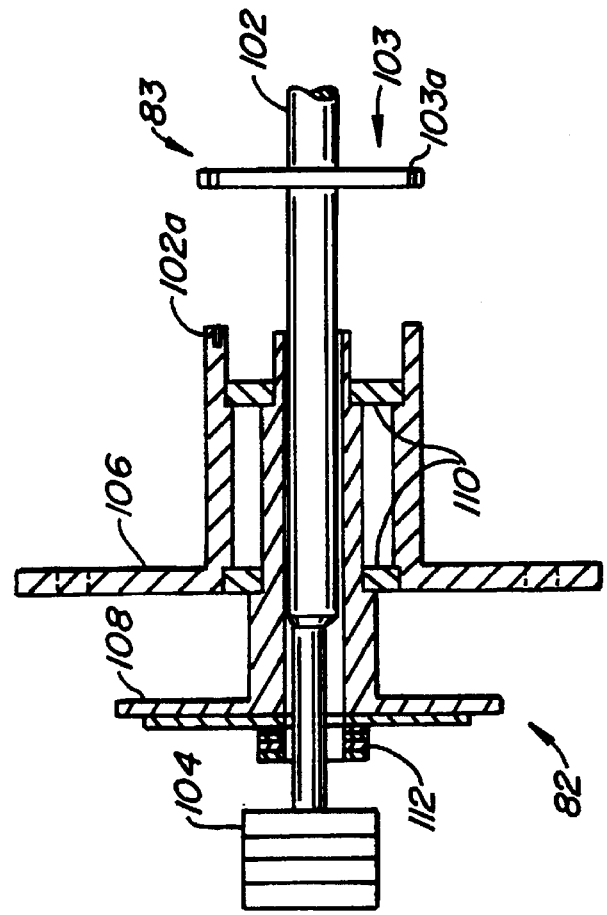
FIG. 6 is a side cross-sectional view of a portion of the chip cutter of FIG. 5 connected to a multiple belt pulley for rotating the chip cutter.
Figure 7:
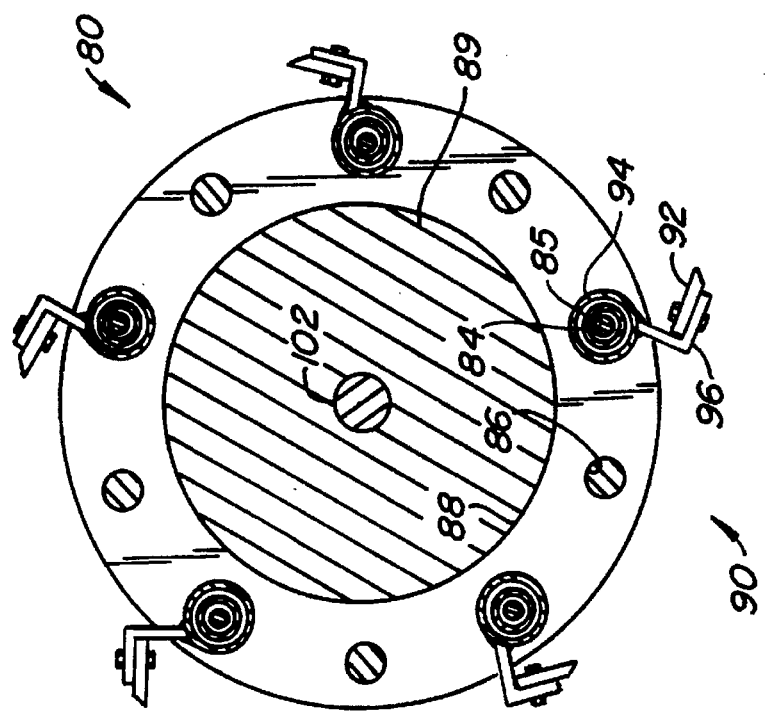
FIG. 7 is a front sectional view of the chip cutter of FIG. 5.

The fiber and the organic material, e.g., almond wood chips, are chopped into fine pieces by a chip cutter before they are mixed with the water to form the slurries. FIGS. 5-9 illustrate the preferred embodiment of a chip cutter 80 according to the present invention. As shown in FIGS. 5 and 7, chip cutter 80 includes an outer base assembly 82 that is made up of a plurality of threaded rods 85 extending through circumferentially spaced holes 86 in a number of annular spacer disks 88. A number of pipes 84 are placed over the threaded rods 85 between holes 86 in disks 88 in a sequential manner. Pipes 84 are also preferably held to a drive assembly 106 on each end of outer assembly 82 with a conventional washer 91. As shown in FIG. 6, drive assemblies 106 are connected to an axial shaft 102 through an end plate 103 with bolts extending through holes 103a in end plate 103 and tapped holes 102a in drive assembly 106.

A plurality of cutting blade assemblies 90 are slidably and rotatably coupled to pipes 84. As best shown in FIGS. 8 and 9, cutting blade assemblies 90 each include a blade 92 mounted to a hollow tube 94 via a mounting bracket 96 so that blade 92 is spaced from tube 94. This allows blade 92 to rotate relative to outer assembly 82, as discussed below. Blade 92 is preferably constructed of metal, such as high speed steel, and includes a base portion 93 and a sharpened tip 95 facing opposite tube 94. Mounting bracket 96 is bonded, e.g., welded, to the outer surface of tube 94 and is preferably angled such that blade 92 extends in a substantially radial direction relative to tube 94. Mounting bracket 96 and blade 92 each include a pair of holes 98 for receiving bolts 100 for connecting blade 92 to bracket 96. Of course, the invention is not limited to this configuration and blade 92 may be mounted to tube 94 in a variety of conventional manners.

Referring again to FIGS. 5 and 7, tubes 94 are disposed around pipes 84 between spacer disks 88 so that cutting blade assemblies 90 are slidably and rotatably disposed about pipes 84. In this manner, blades 92 will rotate slightly relative to base assembly 82 when base assembly 82 is rotated around the axis of shaft 102. This provides flexibility to blades 92 during the cutting of chips, paper products, etc., as discussed below. The diameter of tubes 94 will be close enough to the outer diameter of pipes 84 such that rotation of base assembly 82 will effect a rotation of cutting blade assemblies 90. In the preferred embodiment, chip cutter 80 will include between 5-100 cutting blade assemblies and more preferably about 50 cutting blade assemblies, extending circumferentially around the longitudinal axis of outer assembly 82 (see FIG. 7). Tubes 94 extend beyond mounting bracket 96 and cutting blades 92 to permit contact of tubes 94 against disc 88 while rotating around pipes 84. Cutting blade assemblies 90 are mounted on alternating pipes 84 to allow room for each blade 92 to rotate without contacting an adjacent blade 92. Preferably, about 1-24 cutting blade assemblies 90 will be disposed along each rod 25 (i.e., in the longitudinal direction, see FIG. 5).

It should be noted that the present invention is not limited to the above configuration for spacing cutting blade assemblies 90 from each other. For example, the blade assemblies may alternate in both the longitudinal and circumferential direction. In this configuration, all of the cutting assemblies would be disposed on pipes. However, they would alternate so that a cutting assembly will be disposed on every other pipe in the circumferential direction and offset between every other spacer disk in the longitudinal direction.

As shown in FIGS. 5 and 6, axle shaft 102 is coupled to a motor shaft (not shown) via a multiple belt pulley 104 for rotating base assembly 82 and cutting blades 92 therewith around the shaft axis 102. A second drive assembly 83 is mounted on the opposite end of outer assembly 82. In the preferred embodiment, outer assembly 82 includes a wheel hub 106 coupled to an axle 108 by a pair of roller bearings 110. Axle 108 is, in turn, coupled to axle shaft 102 by an outer support bearing 112. The axle, axle shaft and wheel hub can be specifically manufactured for chip cutter 80 or, alternatively, these pieces can be removed from a suitable existing axle, such as the rear drive axle of trucks.

To cut the fiber and almond wood chips, a motor (not shown) is energized so that multiple belt pulley 104 rotates axle shaft 102 at a suitable speed, preferably between 2000 to 4000 RPM. Axle shaft 102 rotates base assembly 82 and cutting blade assemblies 90 about the axis of shaft 102. The fiber and almond wood chips are then fed into assembly 82 so that blades 92 chop them into fine pieces.

Although the foregoing invention has been described in detail for purposes of clarity of understanding, it will be obvious that certain modifications may be practiced within the scope Of the appended claims. For example, flour or vegetable starch can be added to the second slurry to facilitate the binding of the two slurries together. Alternatively, a fire retardant, such as clay, can be used as a binding agent. In this configuration, the collar would be additionally useful as a firebreak between fields.

What is claimed is:

1. A method for manufacturing a device for suppressing weeds and enhancing plant growth comprising:

mixing a first fibrous material with a fluid to form a first slurry;

cutting a biodegradable, organic material into a multiplicity of finely chopped pieces;

allowing the finely chopped pieces to decompose;

combining the decomposed finely chopped pieces with a second fibrous material and a fluid to form a second slurry;

wherein the biodegradable, organic material is selected from the group consisting of almond wood chips, straw, manure and leaves;

combining the first slurry with the second slurry to form a first layer substantially comprising the first fibrous material adhered to a second layer substantially comprising the organic material; and removing a substantial portion of the fluid from the first and second layers to form a solidified ground collar for suppressing weeds and enhancing plant growth.

2. The method of claim 1 wherein the mixing fibrous material step comprises:

cutting a paper product into a multiplicity of fine paper pieces; and combining the fine paper pieces with water to form the first slurry.

3. The method of claim 2 wherein the paper product is newspaper.

4. The method of claim 2 wherein the first slurry comprises at least 80% water.

5. The method of claim 2 wherein the cutting step comprises:

rotating a cutting device comprising a base assembly and a plurality of blades attached thereto such that the blades revolve around a longitudinal axis of the base assembly; and feeding the paper product towards the base assembly of the cutting device such that the blades cut the paper product into the fine paper pieces.

6. The method of claim 1 wherein the combining step comprises:

directing the first slurry onto a movable belt having small openings;

pressing the first slurry against the belt to drain a portion of the water through the small openings to form a partially solidified layer of fibrous material; and directing the second slurry onto the partially solidified layer on the movable belt.

7. The method of claim 6 further including the step of drawing a portion of the water out of the first slurry with a source of vacuum.

8. The method of claim 1 wherein the removing step comprises the steps of:

pressing the first and second layers against a movable mesh screen belt such that a first portion of the fluid within the layers is forced through openings in the mesh screen belt;

applying thermal energy to the first and second layers to remove a second portion of the fluid therefrom; and adhering the first layer to the second layer.

9. The method of claim 1 further comprising the step of forming a hole through the solidified ground collar.

10. The method of claim 1 further comprising the step of forming a concave upper surface on the solidified ground collar.

11. The method of claim 9 further comprising the step of forming a slit through the solidified ground collar from an outer surface of the collar to the hole to facilitate disposition of the collar around a plant.

12. The method of claim 1 further including the step of mixing a water soluble soil-conditioning agent into the first slurry.

13. The method of claim 1 further including the step of mixing at least one seed into the first slurry.

* * * * *